United States Patent Office 3,640,939
Patented Feb. 8, 1972

3,640,939
STABILIZED HIGHLY AROMATIC OIL MASTER-
BATCHES OF COUPLED SOLUTION POLYMERS
Antonio A. Geraldo, Borger, Tex., assignor to
Phillips Petroleum Company
No Drawing. Filed Mar. 7, 1969, Ser. No. 805,356
Int. Cl. C08f 45/52
U.S. Cl. 260—33.6                                13 Claims

ABSTRACT OF THE DISCLOSURE

Mooney viscosity stability of highly aromatic oil extended masterbatches of coupled solution polymerized polymers is improved.

---

This invention relates to a process for stabilizing the Mooney viscosity of highly aromatic oil extended masterbatches of coupled solution polymerized polymers.

In another aspect, it relates to a stabilized masterbatch of a highly aromatic oil and a coupled solution polymerized polymer.

In recent years, improved rubbery polymers have been produced by the well-known solution polymerization process using many types of organometallic polymerization initiators. It is also known that certain of these solution polymerized polymers such as produced by some conjugated dienes and including copolymers made from conjugated dienes and various other compounds such as vinyl-substituted aromatic compounds, have a tendency to cold flow while in the unvulcanized or uncured state.

It is also known that in order to eliminate cold flow, it is possible to crosslink the molecules of the polymer, such as is done by conventional curing. This approach, however, cannot be employed in cases where the polymers must later be processed in masticating equipment. The formation of relatively large amounts of gel as the result of this crosslinking greatly reduces the ease with which the polymers can be admixed with other materials in fabricating. Therefore, it was highly desirable to provide a method whereby the tendency of these polymers to cold flow is reduced without increasing the difficulty of processing in conventional masticating equipment.

Various coupling agents, i.e., shortstop treating agents, have provided an improved polymer which is readily processible yet has very little tendency to cold flow in the uncured state indicated above. U.S. Pat. 3,281,-383, issued to Zelinski et al., Oct. 25, 1966 and U.S. Pat. 3,393,182, issued to Trepka, July 16, 1968 are exemplary of these treating agents employed to reduce the tendency of these polymers to cold flow.

It has, however, been found that although these treating agents have been exceptionally successful in dealing with the cold flow problem, that when these polymers are extended with highly aromatic oils to form an oil/polymer masterbatch; such as is commercially desirable, that undesirable decreases in Mooney viscosity have been observed.

These highly aromatic oil masterbatches tend to have a poor high temperature stability and shelf storage history leading to many problems.

Also, at times, it becomes necessary, as in commercial plants, to hold masterbatch crumbs under agitation at high temperatures in a crumb slurry tank for extensive periods such as if problems occur in the drying area. This also has caused deleterious Mooney viscosity decrease as has storage over extended periods. The importance of stabilizing an oil masterbatch of polymer is particularly emphasized when the masterbatch has been commercially prepared to meet certain specifications and Mooney viscosity requirements of the consumer.

A process has now been discovered to stabilize the Mooney viscosity of highly aromatic oil masterbatches of solution polymerized polymer that has been treated with a coupling agent as described in U.S. Pat. 3,393,182, and U.S. Pat. 3,281,383.

It is an object of this invention to provide a process for stabilizing highly aromatic oil masterbatches of coupled polymerized polymer. It is a further object of this invensolution polymerized polymer. It is a further object of this invention to provide a stabilized masterbatch of a highly aromatic oil and a coupled solution polymerized polymer.

Other objects, features, and advantages of my invention will be apparent to those skilled in the art from the following disclosure and discussion.

According to the present invention a stabilized highly aromatic oil masterbatch of coupled solution polymerized polymer is produced by adding an alkylene polyamine compound to the soltuion polymerized polymer at any time after the polymerization reaction has been short-stopped with a coupling agent as hereinbefore mentioned, and before the oil masterbatch has been steam stripped. The addition of the alkylene polyamine compound provides a method for improving the maintenance of the Mooney viscosity of the oil masterbatch at the desired levels.

The alkylene polyamine stabilizers for the highly aromatic oil masterbatches of the solution polymerized coupled polymer can be represented by the following formula:

wherein each R is an alkylene, cycloalkylene, alkylcycloalkylene, or cycloalkylalkylene radical containing from 2 to 20 carbon atoms, and where $x$ is an integer from 0 to 6. Within this group of compounds, a preferred group can be represented by the formula $$H_2NCH_2(CH_2NHCH_2)_xCH_2NH_2$$

wherein $x$ is an integer from 1 to 6. It is also necessary that said compound have a normal boiling point of higher than about 200° F. Exemplary of some of these compounds are:

1,3-diaminopropane;
1,4-diaminocyclohexane;
1,10-diaminodecane;
1,20-diaminoeicosane;
1,8-diaminocyclododecane;
3-ethyl-1,4-diaminocyclooctane;
4-cyclopentyl-1,8-diaminooctane;
diethylenetriamine;
triethylenetetramine;
tetraethylenepentamine;
pentaethylenehexamine;
hexaethyleneheptamine, and the like.

According to this invention, a wide range of compounds can be employed as the monomers in the solution polymerization process. Broadly, they are generally conjugated dienes and more specifically, conjugated dienes containing from 4 to 12 carbon atoms per molecule, and preferably those which contain from 4 to 8 carbon atoms per molecule. Exemplary of some of these monomers are 1,3-butadiene; isoprene; piperylene; 2,3-dimethyl-1,3-butadiene; 1,3-octadiene; 4,5-diethyl-1,3-octadiene; and the like. These conjugated dienes can be polymerized to form homopolymers or they can be copolymerized one with another. Conjugated dienes can also be copolymerized with one or more mono-vinyl containing monomers such as styrene and alkyl styrenes, e.g., 3-methylstyrene; 3,5-diethylstyrene; 4-n-propylstyrene; 2,4,6-trimethylstyrene;

3-methyl-5-n-hexylstyrene; 2,3,4,5-tetramethylstyrene; 4-dodecylstyrene; 4-cyclohexylstyrene; 4-phenylstyrene; 4-p-tolylstyrene; and the like.

The conjugated dienes can also be copolymerized with other monovinyl-containing monomers such as 1-vinylnaphthalene; 2-vinylnaphthalene; 4-methyl-1-vinylnaphthalene; 3-ethyl-2-vinylnaphthalene; 4,5-dimethyl-1-vinylnaphthalene; 4,5-diethyl-2-vinylnaphthalene; 6-isopropyl-1-vinylnaphthalene; 2,4 - diisopropyl-1-vinylnaphthalene; 4 - n-propyl-5-n-butyl-2-vinylnaphthalene; and the like. When copolymers of conjugated dienes and monovinyl containing aromatic compounds are formed, it is preferred to have the major amount of conjugated dienes and a minor amount of vinyl-containing aromatic compounds in the polymerization system.

Organoalkali metal compounds including mono- and polyalkali metal compounds, such as employed in U.S. Pat. 3,393,182 can be used as polymerization initiators according to this invention. Multifunctional polymerization initiators also can be employed. The organolithium initiators are preferred.

As hereinbefore stated, the polymerization process, conducted according to this invention, is shortstopped with those treating agents described in U.S. Pat. 3,393,182 and U.S. Pat. 3,281,383. Of the compounds employed in these patents, it is preferred to use $SnCl_4$ of U.S. Pat. 3,393,182 and $SiCl_4$ of U.S. Pat. 3,281,383 as the coupling agents.

The process of producing polymers having a reduced tendency to cold flow as described in these two patents is incorporated into this application by reference thereto.

The coupled solution produced polymers that have thus been shortstopped according to these incorporated references are treated according to this invention. As hereinbefore stated, such polymers when admixed with highly aromatic oils to form oil masterbatches and not treated according to this invention exhibit Mooney viscosity instability.

Oils of the type that are employed to form the oil masterbatch have been classified as highly aromatic oils and are referred to as "Type 101" under ASTM classification (ASTM D-2226) and will generally be referred to throughout the specification and claims as simply highly aromatic oils.

The concentrations of oil and methods of forming the oil masterbatch will depend upon the desires of the consumer or user and can be easily determined by those skilled in the art. Both the concentration and methods have been discussed at great length in the prior art and it is therefore not necessary to include any additional discussion here, since this would only make this specification more voluminous. Generally, however, oil in concentrations of 10 to 50 parts by weight per 100 parts by weight rubber (phr.) are employed.

According to this invention, the alkylene polyamine compound is admixed any time after the shortstop, i.e., coupling agent, is added but before the oil masterbatch is steam stripped or otherwise treated to isolate the polymer. It can be added with a highly aromatic oil, before the oil, or after the oil is blended with the coupled polymer solution. The preferred order of preparation is the addition of the shortstop agent followed by the alkylene polyamine stabilizer and then by the oil (in line blended), followed by steam stripping and extruder drying. The amount of alkylene polyamine compound employed according to this invention is from about 0.05 to 1.0 part by weight per 100 parts by weight of polymer. The preferred range is from about 0.10 to 0.75 part by weight per 100 parts by weight of polymer.

Illustrative of the foregoing discussion and not to be interpreted as a limitation on the ingredients therein employed or upon the scope of this invention, the following examples are presented.

EXAMPLE I

Polymer samples were prepared using n-butyllithium or multifunctional polymerization initiators and with either $SnCl_4$ or $SiCl_4$ as the shortstop coupling agent according to the following formula:

RECIPE

| | Parts |
|---|---|
| Cyclohexane | 800 |
| Butadiene | 100 |
| n-Butyllithium or | Variable |
| Multifunctional initiator (divinylbenzene/Li mol ratio .35/1) | Variable |
| Shortstop: | |
| $SnCl_4$ or | Variable |
| $SiCl_4$ | Variable |
| Tetraethylenepentamine (TEPA) (when used) | Variable |

Cyclohexane was charged first, then the reactor was purged with nitrogen and butadiene was added followed by the n-butyllithium or multifunctional initiator. The polymerization was initiated at 130° F. and the temperature peaked at 200° F. Quantitative conversions were obtained in 30 to 40 minutes. The shortstop was added at peak temperatures and the mixture cooled for 10 minutes after the shortstop was added. The alkylene polyamine was added followed by 37.5 phr. (parts hundred rubber) Philrich 5 (trademark), steam stripped and extruder dried.

A viscous, dark-colored, highly aromatic staining-type oil classified as "Type 101" under the current ASTM D-2226-63T. It possesses the following specifications:

| | Typical | Minimum | Maximum | Test method, ASTM D |
|---|---|---|---|---|
| API gravity | 11.2 | 10.0 | 13.5 | 287-55 |
| Specific gravity, 60° F | 0.9916 | 0.9759 | 1.0000 | 1350-56 |
| Lbs./gal. at 60° F | 8.26 | | | 1250-56 |
| Flash point COC, °F | 475 | 440 | | 92-57 |
| Fire point COC, °F | 550 | 535 | | 92-57 |
| Pour point, °F | 50 | | +65 | 97-57 |
| Viscosity, SUV at 210° F | 170 | | 200 | 88-56 |
| Aniline point, °F | 120 | 100 | 140 | 611-55T |
| Clay gel analyses, weight percent: | | | | |
| Asphaltenes | 0.0 | | 0.75 | 2007-62T |
| Polor compounds | 13.0 | | 25 | 2007-62T |
| Aromatics | 72.0 | 55 | | 2007-62T |
| Saturates | 14.4 | | 20 | 2007-62T |

The multifuncitonal initiator when employed was prepared by reacting a polyvinyl aromatic compound in the presence of a solubilizing monomer such as butadiene with an organomonolithium compound using the following recipe in a 20 gallon reactor.

| | Parts by weight (mmoles) |
|---|---|
| Butadiene | 100 |
| Divinylbenzene (DVB) | 9.1 (70) |
| Cyclohexane | 1000 |
| n-Butyllithium | 12.8 (200) |

The above compounds were charged in the following order in preparing the multifunctional initiator: cyclohexane, DVB, butadiene and n-butyllithium.

Wet masterbatch crumb was heat soaked under agitation and 180° F. Samples were removed after 0, 6, and 16 hours heat soaking and were mill dried and Mooneys were measured.

Mooney changes during this retention of the wet polymer crumb at high temperature are reported in Table 1.

The example and data in Table I demonstrate the surprising stabilizing effect of relatively small amounts of alkylene polyamine on the Mooney viscosity.

TABLE I

| Run No. | Initiators [a] | Initiator, phm. | Shortstop | Shortstop, phm. | TEPA [b], phr. | Masterbatch [c] | Mooney, ML-4 Heat soaked at 180° F. hours | | | |
|---|---|---|---|---|---|---|---|---|---|---|
| | | | | | | | 0 | 6 | 16 | Δ [d] |
| 1 | NBL | .051 | SiCl₄ | .0115 | | 53 | 53 | 53 | 44 | 9 |
| 2 | NBL | .051 | Same | .0115 | .5 | 55 | 55 | 50 | 58 | 0 |
| 3 [e] | NBL | .050 | ...do... | .021 | | 51 | 51 | 38 | 31 | 20 |
| 4 [e] | NBL | .050 | ...do... | .021 | .5 | 50 | 50 | 49 | 50 | 0 |
| 5 [e] | NBL | .050 | ...do... | .021 | .25 | 53 | 53 | 52 | 44 | 9 |
| 6 [e] | NBL | .050 | ...do... | .021 | .10 | 53 | 53 | 49 | 47 | 6 |
| 7 | MI | .0728 | ...do... | .0074 | | 49 | 49 | 46 | 37 | 12 |
| 8 | MI | .0728 | ...do... | .0074 | .5 | 50 | 50 | 48 | 50 | 0 |
| 9 [e] | NBL | .052 | SiCl₄ | .0447 | | 52 | 52 | 42 | 25 | 28 |
| 10 [e] | NBL | .052 | SiCl₄ | .0447 | .5 | 52 | 52 | 44 | 41 | 11 |

[a] NBL is n-butyllithium, MI is multifunctional initiator (0.3511-divinylbenzene/lithium mole ratio).
[b] Phr=parts per hundred of rubber (polymer), by weight.
[c] Mooney after admixing of oil.
[d] Δ=0 hour to 16 hours Mooney drop.
[e] Ionol—1.0 phm. (2,6-di-tert-butyl-4-methylphenol) antioxidant added.

EXAMPLE II

A copolymer of butadiene/styrene was prepared according to the following recipe:

| | Parts |
|---|---|
| Butadiene | 75 |
| Styrene | 25 |
| Cyclohexane | 800 |
| Tetrahydrofuran | 1.5 |
| Multifunctional initiator [1] | Variable |
| Shortstop, SiCl₄ | Variable |
| Ionol [2] | 1 |

[1] As in Example I.
[2] Antioxidant (2,6-di-tert-butyl-4-methylphenol).

Cyclohexane was charged to the reactor first and then purged with nitrogen. The butadiene was then added followed by the styrene and then the multifunctional initiator. The polymerization was initiated at 130° F. and the temperautre peaked at 200° F. One-hundred percent conversion was obtained in 24 minutes. The shortstop was added at the peak temperature; the alkylene polyamine stabilizer then added (if at all), followed by the addition of 37.5 phr. of Philrich 5 (a trademark) as in Example I. The mixture was steam stripped to form the masterbatch crumb and wet masterbatch crumb was heat soaked under agitation at 180° F., for up to 16 hours as in Example I. Samples were removed and Mooneys measured as in Example I.

The foregoing example and Table II demonstrate the stabilizing effect of the alkylene polyamine stabilizers on the Mooney viscosity of copolymers.

TABLE II

| Run No. | Initiator, phm. | Shortstop, phm. | TEPA, phr. | Masterbatch [a] | Mooney, ML-4 Heat soaked at 180° F, hours | | | |
|---|---|---|---|---|---|---|---|---|
| | | | | | 0 | 6 | 16 | Δ [b] |
| 1 | .1315 | .043 | | 65 | 65 | 60 | 53 | −12 |
| 2 | .1315 | .043 | .5 | 61 | 61 | 59 | 59 | −2 |
| 3 | .109 | .0313 | | 60 | 60 | 54 | 53 | −7 |
| 4 | .109 | .0313 | .5 | 59 | 59 | 58 | 62 | 3 |
| 5 | .108 | .027 | | 64 | 64 | 60 | 43 | −21 |
| 6 | .108 | .027 | .5 | 66 | 66 | 52 | 71 | +5 |

[a] Mooney after admixing oil.
[b] Δ=The Mooney change from 0 hour to 16 hours.

EXAMPLE III

Pound samples of each masterbatch bale from Example I were wrapped and stored at room temperature or at 160° F. in a forced draft dryer. Mooneys were then measured at weekly intervals for 3 weeks. The results are reported in Table III.

TABLE III

| Run No. | Masterbatch from Example I Run #— Table I | TEPA, phr. | Mooney ML-4 Room temperature aging, weeks | | | | | 160° F aging, weeks | | | |
|---|---|---|---|---|---|---|---|---|---|---|---|
| | | | 0 | 1 | 2 | 3 | Δ | 1 | 2 | 3 | Δ [a] |
| 1 | 1 | | 53 | 52 | 53 | 55 | 0 | 45 | 51 | 47 | −6 |
| 2 | 2 | .5 | 55 | 55 | 55 | 57 | +2 | 55 | 55 | 53 | −2 |
| 3 | 7 | | 49 | 47 | 47 | 45 | −4 | 40 | 44 | 41 | −8 |
| 4 | 8 | .5 | 50 | 50 | 49 | 49 | −1 | 49 | 50 | 52 | +2 |
| 5 | 3 | | 51 | 51 | 50 | 49 | −2 | 48 | 39 | 33 | −18 |
| 6 | 4 | .5 | 50 | 54 | 51 | 51 | ±1 | 59 | 56 | 49 | −1 |
| 7 | 6 | .1 | 53 | 55 | 54 | 56 | +3 | 56 | 55 | 46 | −7 |

[a] Δ=Mooney change from 0 week to 3 weeks.

The foregoing example reported in Table III further exemplifies the Mooney viscosity stabilizing effect of the alkylene polyamine compounds of this invention.

EXAMPLE IV

Samples of masterbatch crumb from Example I were tested for physical properties upon incorporation into the following compounding recipe:

| | Parts |
|---|---|
| Masterbatch (various runs from Example I) | 137.5 |
| NBS [a] HAF [b]—black | 85 |
| NBS zinc oxide | 3 |
| Catalin resin No. 8318 [c] | 5 |
| Staybelite resin [d] | 5 |
| NBS stearic acid | 2 |
| NOBS No. 1 [e] | 1.2 |
| NBS sulfur | 2.5 |

[a] National Bureau of Standards.
[b] High abrasion furnace carbon black.
[c] Oil soluble, thermoplastic, non-heat reactive phenolic resin.
[d] Trademark, hydrogenated rosin.
[e] A blend of 90% N-oxydiethylene benzothiazole-2-sulfenamide and 10% benzothiazyl disulfide.

The above compounded mixture was cured and tested for physical properties. The results of the various test procedures are reported in Table IV. The results demonstrate that the vulcanizate properties of a rubber treated according to this invention are comparable or improved over rubber that has not been so treated.

TABLE IV

| Run No. | Masterbatch from Example I Run #— Table I | TEPA, phr. | 300% modulus,[a] p.s.i.— cure time, minutes | | | 50-minute cure time | | | | |
|---|---|---|---|---|---|---|---|---|---|---|
| | | | 25 | 50 | 100 | Tens. p.s.i.[c] | Elongation, percent[a] | Temperature, °F.[b] | Resil., percent[c] | Shore A Hardness |
| 1 | 1 | ---- | 430 | 1,140 | 1,350 | 2,680 | 560 | 79.6 | 57.8 | 64 |
| 2 | 2 | .5 | 430 | 1,090 | 1,270 | 2,695 | 550 | 76.3 | 58.2 | 64.5 |
| 3 | 3 | ---- | 500 | 1,190 | 1,360 | 2,670 | 530 | 84.5 | 57.3 | 65 |
| 4 | 4 | .5 | 670 | 1,375 | 1,540 | 2,675 | 480 | 81.2 | 60.1 | 66 |
| 5 | 5 | .25 | 720 | 1,180 | 1,500 | 2,700 | 530 | 83.6 | 58.2 | 64 |
| 6 | 6 | .10 | 510 | 1,340 | 1,430 | 2,540 | 495 | 84.5 | 58.2 | 64 |
| 7 | 7 | ---- | 410 | 1,030 | 1,370 | 2,675 | 590 | 82.7 | 56.3 | 62.5 |
| 8 | 8 | .5 | 580 | 1,130 | 1,420 | 2,595 | 530 | 80.8 | 58.2 | 65 |

[a] ASTM D-412-62T.
[b] ASTM D-623-62.
[c] ASTM D-945-59.
[d] ASTM D-1706-61.

As will be evident to those skilled in the art, various modifications of this invention can be made or followed, in light of the disclosure and the discussion herein set forth, without departing from the scope or the spirit thereof.

I claim:

1. A process for improving the Mooney viscosity stability of a masterbatch which comprises admixing a highly aromatic oil, a coupled solution polymerized polymer prepared from monomers selected from the group consisting of conjugated dienes and conjugated dienes in admixture with vinyl substituted aromatic compounds and an alkylene polyamine compound represented by the formula $$H_2N-R-\left[\begin{array}{c}H\\|\\N-R\end{array}\right]_x-NH_2$$

wherein each R is an alkylene, cycloalkylene, alkylcycloalkylene, or cycloalkylalkylene radical containing 2 to 20 carbon atoms and where x is an integer from 0 to 6.

2. The process of claim 1 wherein the amount of said alkylene polyamine compound is in the range of about .05 to 1.0 part by weight per 100 parts by weight of coupled solution polymer and said coupled solution polymer is prepared by:
   (a) polymerizing said monomers with an organo alkali-metal catalyst and
   (b) coupling the polymerized monomers by contacting with a compound selected from the group consisting of:
      (A) $R_xSnZ_y$ wherein R is selected from the group consisting of saturated aliphatic, saturated cycloaliphatic and aromatic radicals, Z is selected from the group consisting of fluorine, chlorine, bromine, iodine, $R'—CH=CH—CH_2—$, $—OR''$, $—SR''$, $=S$, $=O$, $—O—R'''—O—$ and $—S—R'''—S—$, wherein R' is selected from the group consisting of hydrogen, saturated aliphatic, saturated cycloaliphatic and aromatic radicals, R'' is selected from the group consisting of saturated aliphatic, saturated cycloaliphatic and aromatic radicals, R''' is an alkylene radical with which oxygen and sulfur form a cyclic compound with the tin atom, said cyclic compound containing from 5 to 8 members in the nucleus, the number of carbon atoms in each R, R' and R'' being in the range of 1 to 12, the number of carbon atoms in R''' being in the range of 2 to 12, when Z is selected from the group consisting of fluorine, chlorine, bromine, iodine, $R'—CH=CH—CH_2—$, $—OR''$ and $—SR''$, x is an integer from 0 to 2 and y is an integer such that $x+y=4$, and when Z is selected from the group consisting of $=S$, $—O$, $—O—R'''—O—$ and $—S—R'''—S—$, y is 1 and x is 2, and
      (B) silicon polyhalides.

3. The process of claim 1 wherein said alkylene polyamine compound is represented by the formula $$H_2NCH_2(CH_2NHCH_2)_xCH_2NH_2$$

wherein x is an integer from 1 to 6 and wherein the amount of said alkylene polyamine compound is in the range of about 0.10 to 0.75 part by weight per 100 parts by weight of polymer.

4. The process of claim 1 wherein said alkylene polyamine compound is tetraethylenepentamine.

5. The process of claim 1 wherein said masterbatch is produced by admixing a highly aromatic oil with a solution polymerized polymer that has been treated with a coupling agent of $SnCl_4$ or $SiCl_4$.

6. The process of claim 1 wherein the alkylene polyamine compound is tetraethylenepentamine and wherein the amount of said alkylenepolyamine compound is in the range of about 0.10 to 0.75 part by weight to 100 parts by weight of polymer and wherein the solution polymerized polymer is coupled with $SnCl_4$ or $SiCl_4$.

7. A process according to claim 1 wherein the alkylene polyamine compound is admixed with the coupled solution polymer prior to the incorporation of the highly aromatic oil.

8. A process according to claim 1 wherein the alkylene polyamine compound is admixed with the coupled solution polymer after the incorporation of the highly aromatic oil.

9. A process according to claim 1 wherein the alkylene polyamide and highly aromatic oil are admixed in combination into the coupled solution polymer.

10. A process according to claim 1 wherein the masterbatch is prepared by:
   (a) adding to the coupled solution polymer, formed by the addition of a coupling agent to a solution polymerized polymer, the alkylene polyamine compound;
   (b) then adding the highly aromatic oil to the coupled solution polymer; and
   (c) then treating the mixture to isolate the masterbatch.

11. A process according to claim 10 wherein the treating of the mixture is by steam stripping.

12. A masterbatch composition having improved Mooney viscosity stability consisting essentially of a highly aromatic oil, a coupled solution polymerized polymer prepared from monomers selected from the group consisting of conjugated dienes and conjugated dienes in admixture with vinyl substituted aromatic compounds, and an alkylene polyamine compound represented by the formula $$H_2N-R-\left[\begin{array}{c}H\\|\\N-R\end{array}\right]_x-NH_2$$

wherein each R is an alkylene, cycloalkylene, alkylcycloalkylene, or cycloalkylalkylene radical containing 2 to 20 carbon atoms and where x is an integer from 0 to 6 wherein the amount of said alkylene polyamine compound is in the range of about .05 to 1.0 part by weight per 100 parts by weight of polymer.

13. The composition of claim 12 wherein the alkylene polyamine compound is tetraethylenepentamine and wherein the amount of said alkylene polyamine compound is in the range of about 0.10 to 0.75 part by weight per 100 parts by weight of polymer and wherein the solution polymerized polymer is coupled with $SnCl_4$ or $SiCl_4$.

(References on following page)

References Cited

UNITED STATES PATENTS

| | | | |
|---|---|---|---|
| 3,004,867 | 10/1961 | Collins | 260—33.6 AO |
| 3,014,883 | 12/1961 | Wolf | 260—33.6 AO |
| 3,092,603 | 6/1963 | Gauslaa | 260—33.6 AO |
| 3,112,288 | 11/1963 | Davis | 260—33.6 AO |
| 3,281,383 | 10/1966 | Zelinski | 260—23.7 |
| 3,393,182 | 7/1968 | Trepka | 260—79.5 B |
| 3,397,167 | 8/1968 | Gruver | 260—33.6 AO |
| 3,424,713 | 1/1969 | Oberster | 260—33.6 AO |

MORRIS LIEBMAN, Primary Examiner

P. R. MICHL, Assistant Examiner